(12) United States Patent
Katayama et al.

(10) Patent No.: US 8,231,170 B2
(45) Date of Patent: *Jul. 31, 2012

(54) VEHICLE ROOF SYSTEM

(75) Inventors: Hajime Katayama, Tochigi-ken (JP);
Ayumi Mihashi, Tochigi-ken (JP)

(73) Assignee: Yachiyo Industry Co., Ltd., Saitama (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/014,417

(22) Filed: Jan. 26, 2011

(65) Prior Publication Data

US 2011/0187160 A1 Aug. 4, 2011

(30) Foreign Application Priority Data

Jan. 29, 2010 (JP) ................................. 2010-019117

(51) Int. Cl.
*B60J 7/057* (2006.01)
(52) U.S. Cl. .................................. 296/216.08; 296/223
(58) Field of Classification Search ............ 296/216.06–216.08, 223
See application file for complete search history.

(56) References Cited

U.S. PATENT DOCUMENTS

| | | | |
|---|---|---|---|
| 5,104,178 A | 4/1992 | Bienert | |
| 6,345,860 B1* | 2/2002 | Adam et al. | 296/223 |
| 6,367,872 B1 | 4/2002 | Bohm et al. | |
| 6,582,014 B1* | 6/2003 | Racine et al. | 296/223 |
| 6,588,834 B2 | 7/2003 | Maeta et al. | |
| 8,075,050 B2* | 12/2011 | Hotta et al. | 296/223 |
| 2007/0182219 A1 | 8/2007 | Mori et al. | |

FOREIGN PATENT DOCUMENTS

| | | |
|---|---|---|
| JP | 50-125416 A | 10/1975 |
| JP | 58-167216 U | 11/1983 |
| JP | 61-067226 U | 5/1986 |
| JP | 61-105215 A | 5/1986 |
| JP | 5-024437 A | 2/1993 |
| JP | 5-131882 A | 5/1993 |

(Continued)

*Primary Examiner* — Dennis Pedder
(74) *Attorney, Agent, or Firm* — Carrier Blackman & Associates, P.C.; William D. Blackman; Joseph P. Carrier

(57) ABSTRACT

In a vehicle roof system for closing and opening a roof opening (2a) formed in a fixed roof panel (2) of a vehicle with a moveable roof panel (4), a pair of push-pull cables (22) extend from an electric motor (24) mounted on a front frame (12) extending along the front edge of the roof opening to either side of the moveable roof panel, and cross each other at three locations (P1-P3) on the front frame in plan view. Idle cable section of the first push-pull cable (22*l*) that meshes with the rear side of a drive gear of the electric motor crosses the drive cable section of the second push-pull cable (22*r*) at one location (P1), and the drive cable section of the first push-pull cable includes a bulging section bulging forward by crossing the idle cable section of the second push-pull cable at two locations (P2 and P3). Thereby, the radius of curvature of the drive cable section of the first push-pull cable can be maximized. This in turn minimizes the frictional resistance to the push-pull cables, and allows a relatively small electric motor to be used. As a result, the thickness of the vehicle roof can be minimized, and the front edge of the roof opening to be brought highly close to the front end of the upper edge of the windshield.

8 Claims, 8 Drawing Sheets

FOREIGN PATENT DOCUMENTS

| | | |
|---|---|---|
| JP | 5-330389 A | 12/1993 |
| JP | 11-240333 A | 9/1999 |
| JP | 2000-127765 A | 5/2000 |
| JP | 8207590 A | 5/2000 |
| JP | 2001-063371 A | 3/2001 |
| JP | 2002-154328 A | 5/2002 |
| JP | 2006-168531 A | 6/2006 |
| JP | 3994815 B2 | 10/2007 |

* cited by examiner

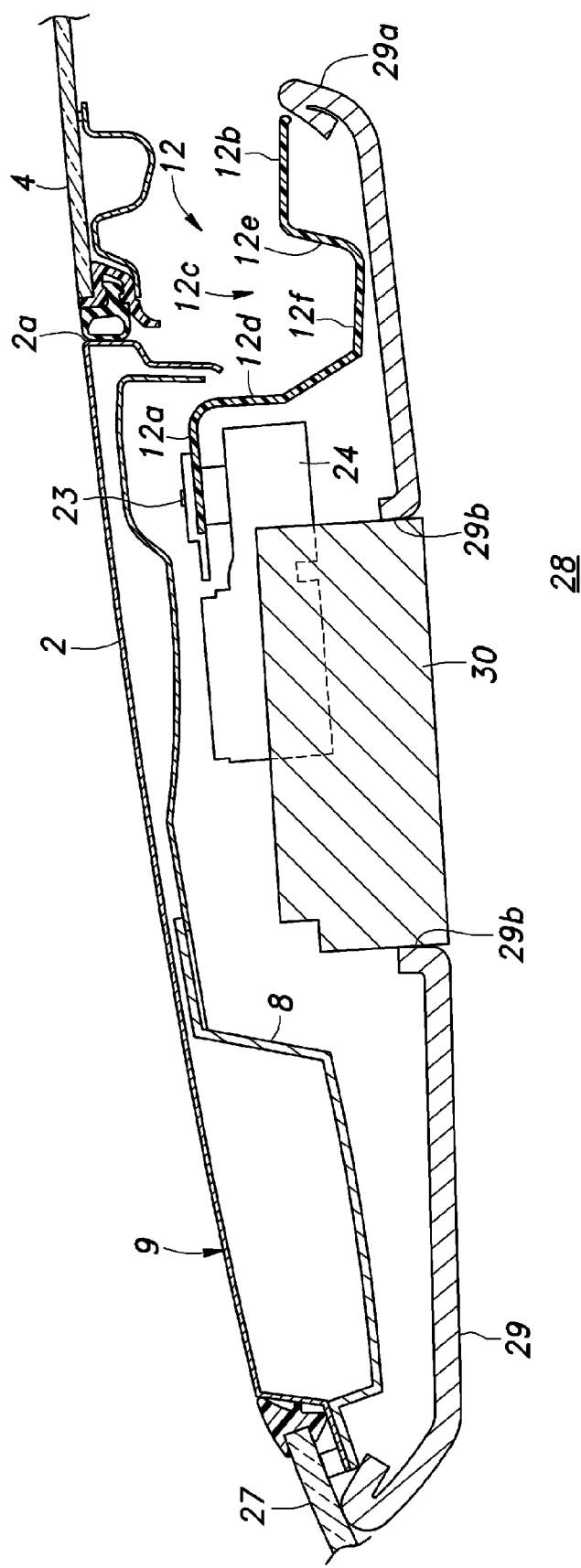

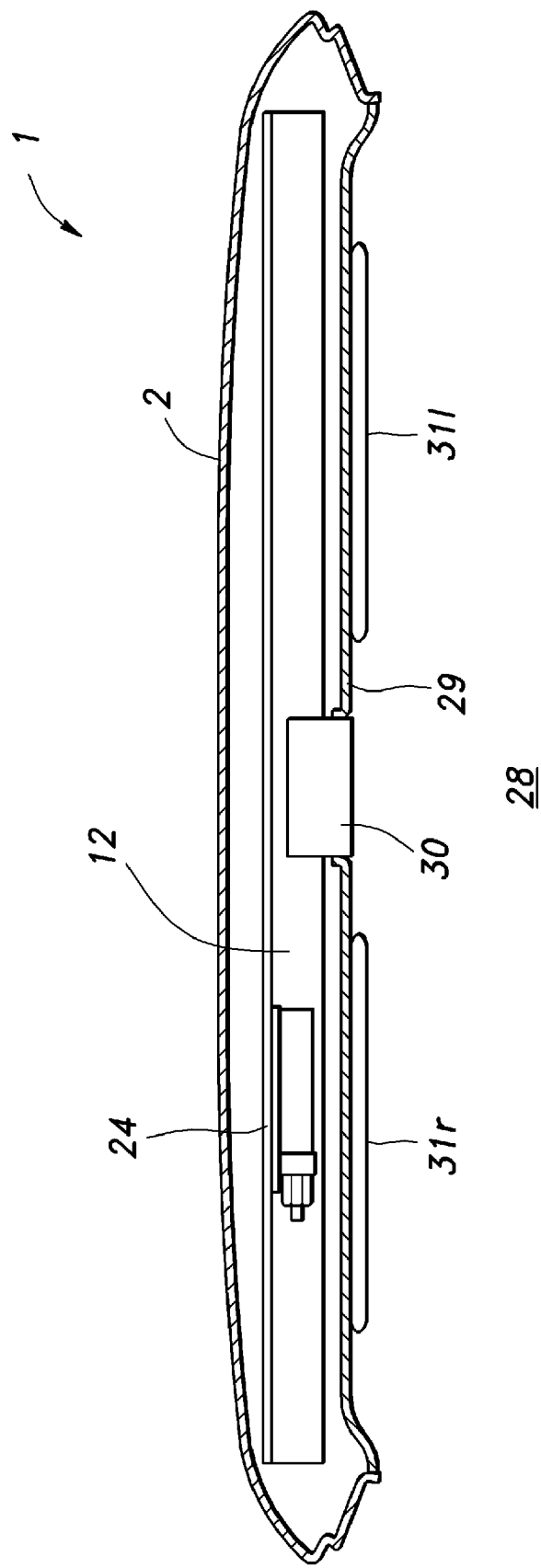

VEHICLE ROOF SYSTEM

TECHNICAL FIELD

The present invention relates to a vehicle roof system including a moveable roof panel and a drive unit for actuating the roof panel between a position to close an opening in a roof of a vehicle and a position to expose the opening.

BACKGROUND OF THE INVENTION

Vehicle roof systems also known as sunroof systems are widely used in passenger vehicles for selectively opening and closing an opening formed in the roof of the vehicle. A typical vehicle roof system comprises a moveable roof panel and a drive unit for actuating the moveable roof panel between a position to close the opening and a position to expose the opening. A pair of guide rails are fixedly secured to the fixed roof panel, and extend along either lateral side of the roof opening, and the moveable roof panel is supported by these guide rails via sliders so as to be slidable in the fore and aft direction. An electric motor is provided centrally on the front edge of the roof opening, and a pair of push-pull cables connected to the corresponding sliders are actuated by the electric motor as required.

The push-pull cable used for such a vehicle roof system typically consists of a flexible steel core wire having another cable wound spirally around the core wire or a plastic belt having a rack gear formed on one side thereof. In a vehicle roof system, each push-pull cable is linearly guided along a cable guide formed in the corresponding side frame, and guided by a curved guide pipe (a drive pipe) secured to a front frame from the front end of the cable guide to the drive gear of the electric motor. The idle cable section of each push-pull cable extending from the drive gear to the free end of the push-pull cable is also guided by a guide pipe (an idle pipe). As the two push-pull cables are required to be synchronized for the smooth actuation of the moveable roof panel, it is essential that the two push-pull cables are guided along the prescribed paths at all times.

The guide pipes were conventionally made of steel pipe, and it was proposed to make the idle pipe from plastic material so that the bending work of the pipe may be simplified. The drive pipes are made of steel, and extend along a common plane, while the idle pipes are made of soft plastic material so that the generation of noises may be avoided when the drive pipe and idle pipe strike each other due to the vibrations of the vehicle body. See Japanese patent No. 3043589 (patent document 1).

It was also proposed to form guides pipes integrally with the front frame made of plastic material for guiding the push-pull cables therein. See Japanese patent No. 3994815 (patent document 2).

However, according to the proposal in patent document 1, as the drive pipes are made of steel, there still is the need to conduct a relatively costly bending work, and no significant weight reduction can be accomplished. Also, because the drive pipe extends beyond the front edge of the front frame, some care is required in handling the drive pipe or the assembly incorporated with the drive pipe so as not to bend it.

The proposal in patent document 2 eliminates the need for the guide pipes, and reduces the number of component parts. However, the die assembly for molding the front frame becomes more complex, and this increases the manufacturing cost. Also, because the guide pipe portions formed in the front frame do not entirely cover the push-pull cables, lubricating grease cannot be contained within the guide pipe portions, and an adequately smooth guide surfaces may not be defined.

Furthermore, when the guide pipe portions are formed integrally with the front frame, the radius of curvature cannot be reduced so much as in the case of more conventional steel guide pipes. The resulting increase in the frictional resistance requires the use a more powerful electric motor, and this in turn causes the thickness of the vehicle roof to be increased. Also, a large radius of curvature requires the fore-and-aft dimension of the front frame to be increased, and this necessitates the front edge of the roof opening to be placed more rearward than desired. If the roof opening is located too far back in the roof, the viewing angle of the vehicle occupant through the roof opening is so upright that the vehicle occupant's field of view is restricted, and the benefits of the sunroof system are diminished.

BRIEF SUMMARY OF THE INVENTION

In view of such problems of the prior art, a primary object of the present invention is to provide a vehicle roof system that can minimize the thickness of the vehicle roof while ensuring a relatively friction free guidance of push-pull cables for actuating the moveable roof panel.

A second object of the present invention is to provide a vehicle roof system that allows the front edge of the roof opening to be brought highly close to the front end of the roof panel (or the upper edge of the windshield).

According to the present invention, such objects can be accomplished by providing a vehicle roof system for closing and opening a roof opening formed in a fixed roof panel of a vehicle with a moveable roof panel, comprising: a front frame secured to a lower surface of the fixed roof panel and extending laterally along a front edge of the roof opening; a pair of side frames secured to the fixed roof panel and extending longitudinally along either side edge of the roof opening; a pair of guide rails fixedly secured to the respective side frames to guide the moveable roof panel for the closing and opening movements thereof; an electric motor attached to the front frame and having a vertically extending output shaft fitted with a drive gear; a first push-pull cable guided along the front frame and meshing with a rear side of the drive gear, the first push-pull cable including a drive cable section extending between the drive gear and a first side part of the moveable roof panel and an idle cable section extending from the drive gear to at least a lateral end of the front frame adjacent to a second side part of the moveable roof panel; and a second push-pull cable guided along the front frame and meshing with a front side of the drive gear, the second push-pull cable including a drive cable section extending between the drive gear and the second side part of the moveable roof panel and an idle cable section extending from the drive gear at least to a lateral end of the front frame adjacent to the first lateral side part of the moveable roof panel; wherein the push-pull cables cross each other at three locations on the front frame in plan view.

Typically, the idle cable section of the first push-pull cable crosses the drive cable section of the second push-pull cable at one location, and the drive cable section of the first push-pull cable includes a bulging section bulging forward by crossing the idle cable section of the second push-pull cable at two locations. The idle cable sections of the push-pull cables may extend along the corresponding side frames on outboard sides of the adjacent drive cable sections of the other push-pull cables.

Thereby, the idle cable section of one of the push-pull cables is allowed to pass behind the bulging section or the foremost part of the drive cable section of the other push-pull cable that engages the rear side of the drive gear and, hence, is otherwise required to be most sharply bent, the radius of curvature of the drive cable section of the other push-pull cable can be maximized. This in turn minimizes the frictional resistance to the push-pull cables, and allows a relatively small electric motor to be used. As a result, the thickness of the vehicle roof can be minimized, and the front edge of the roof opening to be brought highly close to the front end of the roof panel (or the upper edge of the windshield).

This arrangement allows the electric motor to be mounted on the fixed roof panel at a position laterally offset toward the first side of the moveable roof panel, and the middle crossing location of the two push-pull cables to be located at a substantially laterally central part of the fixed roof panel so that the drive cable section of the other push-pull cable that engages the rear side of the drive gear and, hence, is otherwise required to be most sharply bent can be bent in a relatively gradual manner.

According to a preferred embodiment of the present invention, the front frame is attached to the fixed roof panel at a plurality of points laterally arranged along the front edge of the roof opening, and at least one of the attaching points is located between the two push-pull cables so that the reaction which the push-pull cables apply to the front frame can be efficiently supported without causing any undue deformation in the front frame. More preferably, at least two of the attaching points are located between the two push-pull cables on either side of the middle crossing location.

BRIEF DESCRIPTION OF THE DRAWINGS

Now the present invention is described in the following with reference to the appended drawings, in which:

FIG. 7 is a sectional view taken along line VII-VII of FIG. 4;
and
FIG. 8 is a sectional view taken along line VIII-VIII of FIG. 4.

DETAILED DESCRIPTION OF THE PREFERRED EMBODIMENTS

Figure 1:
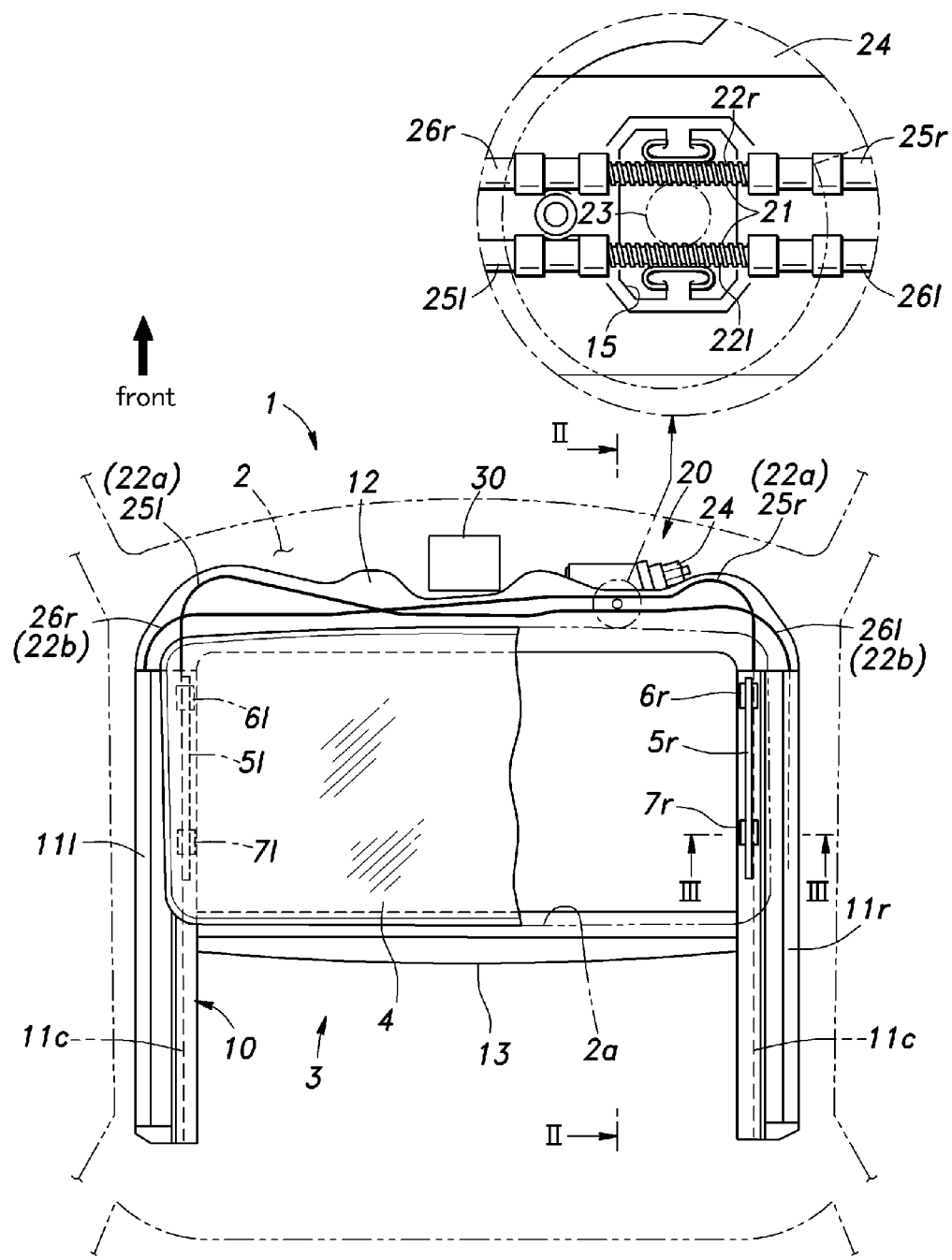
FIG. 1 is a simplified plan view of a vehicle roof system embodying the present invention.

FIG. 1 is a see-through plan view showing the vehicle roof system embodying the present invention. The illustrated vehicle roof 1 comprises a fixed roof panel 2 accounting for a large part of the vehicle roof 1 and formed with a rectangular opening 2a in a front part thereof, and a sunroof system 3 configured to selectively close and open the roof opening 2a.

A large part of this vehicle roof system is symmetric with respect to the central longitudinal plane of the vehicle body, and only one of two symmetric parts may be discussed in the following description where appropriate as the two parts are essentially identical to each other. In some places, such symmetric parts are denoted with a numeral with a suffix r or l as the case may be to indicate on which side of the vehicle body the parts in question are located. In other places, these parts are collectively denoted with the corresponding numeral without a suffix.

The sunroof system 3 comprises a sunroof frame 10 fixedly secured to the roof panel 2 and surrounding the roof opening 2a, a sunroof panel (moveable roof panel) 4 supported by the sunroof frame 2 so as to be moveable at least in the fore and aft direction (slide movement) and a drive unit 20 for actuating the sunroof panel 4 between a fully open position (rearmost position) and a fully closed position (front-most position). The sunroof system 3 of the illustrated embodiment is additionally configured to raise the rear end of the sunroof panel 4 from the fully closed position (tilt movement).

The sunroof frame 10 includes a pair of side frames 11*l* and 11*r* extending along either lateral side of the roof opening 2a, a front frame 12 extending between the front ends of the side frames 11*l* and 11*r* and a center frame 13 extending between intermediate parts of the side frames 11*l* and 11*r*. The front frame 12 extends along the front edge of the roof opening 2a, and the center frame 13 extends along the rear edge of the roof opening 2a. Therefore, the rear ends of the side frames 11*l* and 11*r* extend rearward beyond the rear edge of the roof opening 2a. The front frame 12 is C-shaped in plan view having an open side directed toward the roof opening 2a. In the illustrated embodiment, the side frames 11*l* and 11*r* are made of extruded aluminum alloy, and the front and center frames 12 and 13 are made of extruded plastic material.

Figure 2:
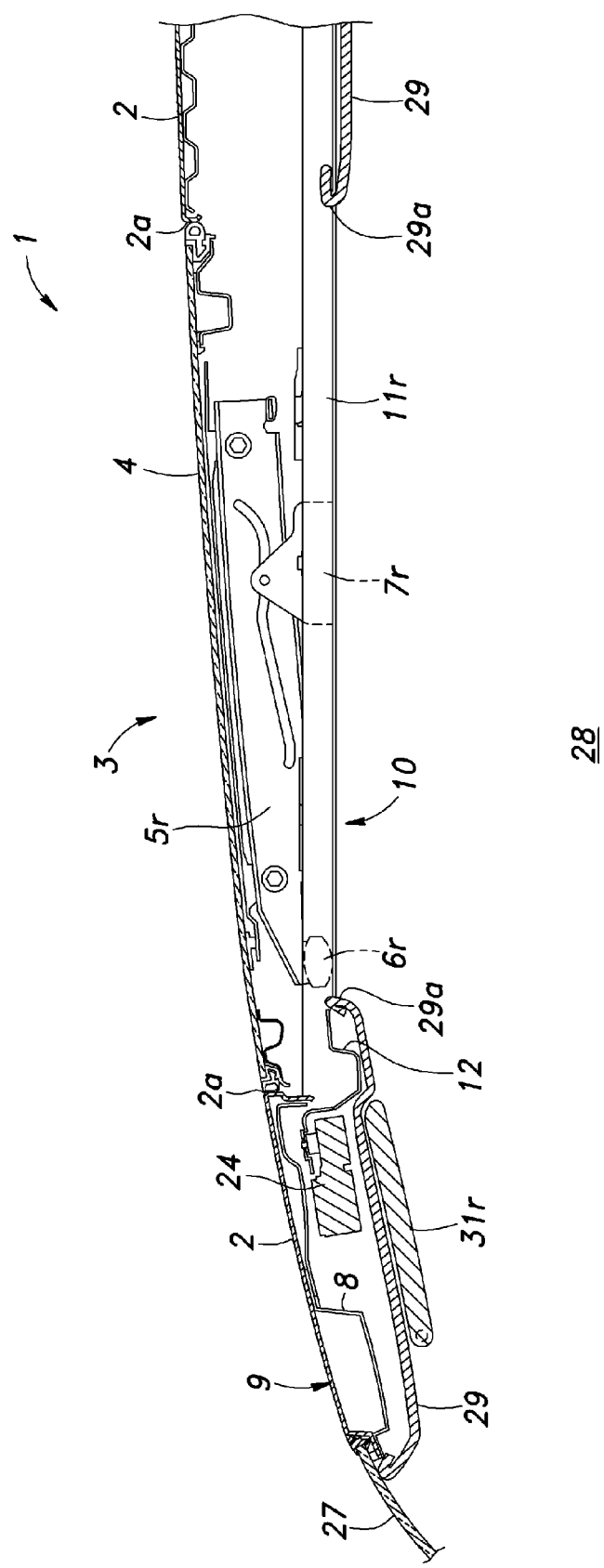
FIG. 2 is a sectional view taken along line II-II of FIG. 1.

Additionally referring to FIG. 2, a pair of panel brackets 5*l* and 5*r* extending in the fore and aft direction are attached to the lower side of the sunroof panel 4 along either lateral edge thereof. The panel brackets 5*l* and 5*r* are fitted with front sliders 6*l* and 6*r* and rear sliders 7*l* and 7*r*, respectively, by which the sunroof panel 4 is slidably supported by the side frames 11. The rear sliders 7*l* and 7*r* are connected to the corresponding panel brackets 5*l* and 5*r* via a cam mechanism that controls the sliding movement and tilting movement of the sunroof panel 4 under the actuating force of the drive unit 20.

A front roof rail 8 is attached to the lower side of the roof panel 2 and extends in parallel with the front frame 12 at a small distance ahead thereof. The front roof rail 8 is trough-shaped with a convex side facing upward so as to form a front roof frame 9 having a closed cross section in cooperation with the roof panel 2. The front edge of the front roof frame 9 adjoins the upper edge of a windshield panel 27. The front part of the roof panel 2 and windshield panel 27 slope downward toward the front part of the vehicle so as to jointly define a smooth outer contour. A roof lining 29 overlies the roof panel 2 from below, and defines an opening 29a slightly smaller than the roof opening 2a so that the edge of the opening 29a slightly extends into the roof opening 2a in plan view. A space defined between the roof panel 2 and roof lining 29 receives the main part of the sunroof system 3.

Figure 3:
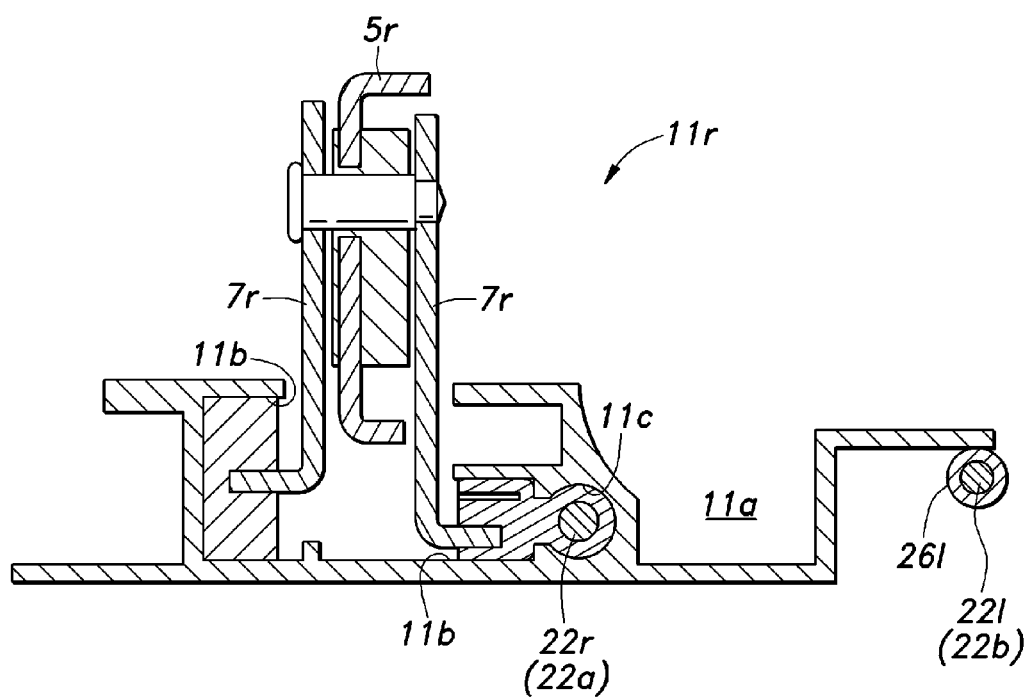
FIG. 3 is a sectional view taken along line III-III of FIG. 1.

As best illustrated in FIG. 3, each side frame 11 is positioned between the roof panel 2 and roof lining 29, and includes a drain trough section 11a having a U-shaped cross section to drain rainwater out of the sunroof system 3, a cable guide section 11c located on the inboard side of the drain trough section 11a and defining a slot for guiding a push-pull cable 22 connected to the rear slider 7, and a guide rail section 11b located on the inboard side of the cable guide section 11c and defining a slot facing outboard to guide the corresponding front slider 6 and rear slider 7.

Figure 4:
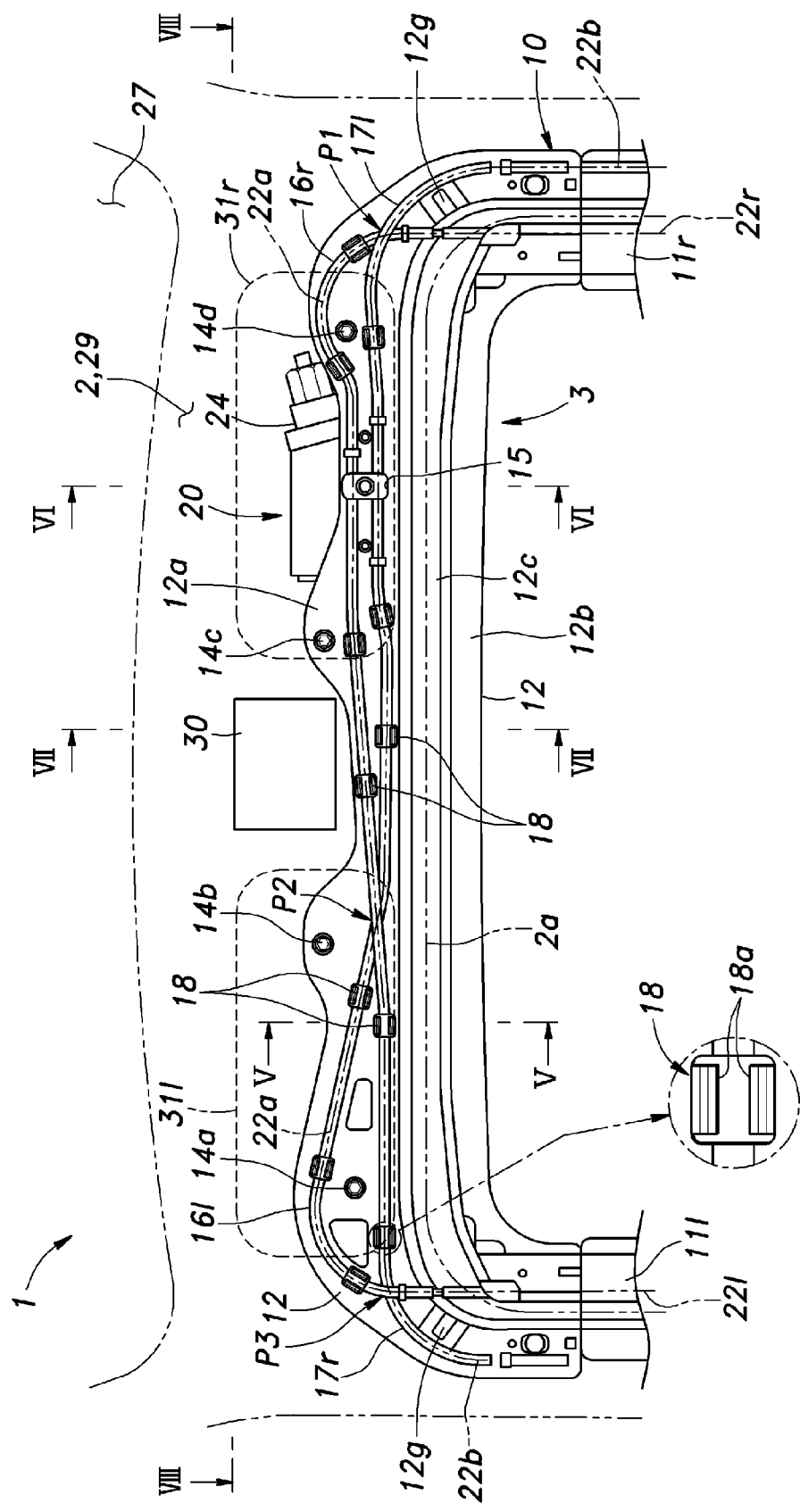
FIG. 4 is an enlarged fragmentary view of a front part of the vehicle roof system.

Referring to FIG. 2, the side frames 11 are disposed horizontally so that the rainwater received in the drain trough section 11a may be drained either in the forward or rearward direction without overflowing when the vehicle is accelerating or decelerating. Accordingly, the roof lining 29 extends substantially horizontally in the region located behind the front edge of the opening 29a, and is bent slightly downward in the region located ahead of the front edge of the opening 29a so as to conform to the contour of the lower surface of the roof panel 2. A pair of sun visor units 31r and 31l for the vehicle operator and the passenger are mounted on the lower side of the part of the roof lining 29 located ahead of the front edge of the opening 29a as shown in FIG. 4.

Referring to FIG. 1, the drive unit 20 includes an electric motor 24 attached to the lower surface of the front frame 12 in a rightwardly offset position and internally incorporated with a gear reduction unit (not shown in the drawings), a drive gear 23 attached to an output end of the electric motor 24, and a pair of push-pull cables 22r and 22l each having one end connected to the corresponding rear slider 7, and defining a driven rack gear 21 formed by spirally winding a steel wire around a steel core wire and meshing with the drive gear 23. The electric motor 24 includes a main body elongated in the direction of a rotor shaft thereof (not shown in the drawings) and at an angle with respect to the lateral direction of the vehicle body. The rear and inboard end of the main body of the electric motor 24 is provided with a gear reduction mechanism which transmits the rotation of the rotor shaft of the electric motor 24 to the output shaft that supports the drive gear 23 and extends vertically.

A map lamp unit 30 is attached to the front frame 12 via a bracket not shown in the drawing, and fitted into an opening 29b formed in the roof lining 29 at a laterally central part therefore (FIG. 7) so that the map lamp unit 30 is received in a space defined between the fixed roof panel 1 and roof lining 29 but is exposed to the passenger compartment. Therefore, the map lamp unit 30 is located centrally adjacent to the front edge of the roof opening 2a while the electric motor 24 is placed laterally offset from the map lamp unit 30 so as not to interfere with each other. In particular, the electric motor 24 does not substantially overlap with the map lamp unit 30 when viewed from the front but substantially overlaps with the map lamp unit 30 when viewed from the side. See FIGS. 7 and 8.

Figure 5:
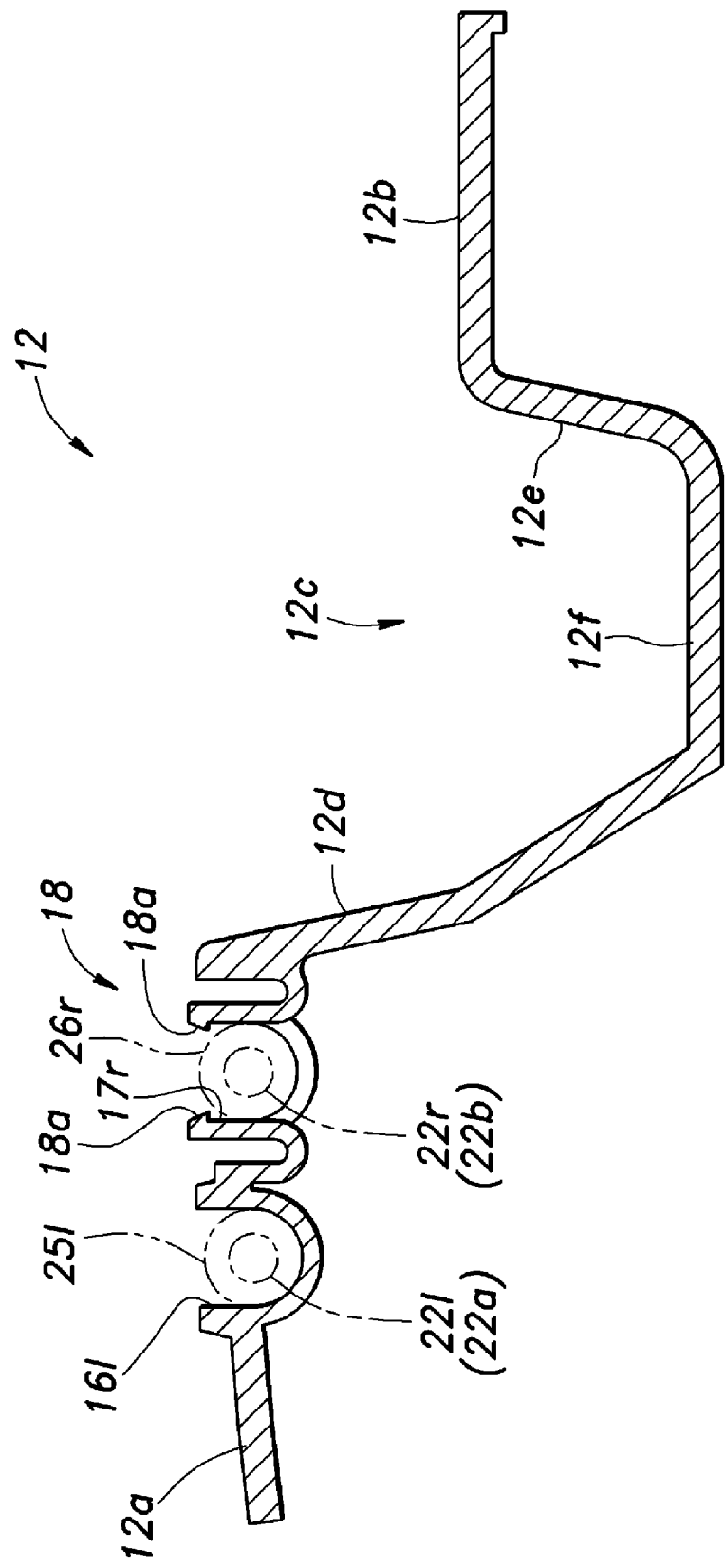
FIG. 5 is a sectional view taken along line V-V of FIG. 4.

Each push-pull cable 22 includes a drive cable section 22a extending from the drive gear 23 to the corresponding rear slider 7 to transmit the drive force of the electric motor 24 to the rear slider 7, and an idle cable section 22b extending from the drive gear 23 in the opposite direction from the drive cable section 22a without being subjected to any loading. The drive cable section 22a is linearly guided by the cable guide section 11c of the side frame 11, and guided by a drive pipe 25 secured to the front frame 12 between the drive gear 23 and the front end of the cable guide section 11c along a curved path. The drive pipe 25 may be conveniently made of plastic material that allows the drive pipe 25 to be curved as desired without any difficulty. The idle cable section 22b is likewise guided by an idle pipe 26 secured to the front frame 12 along a partly curved path (FIG. 5). As the electric motor 24 is offset in the rightward direction, a part of the idle pipe 26l (the part located to the right of the drive gear 23 in FIG. 1) for the left push-pull cable 22l extends rearward from the right end of the front frame 12, and the remaining part of the idle pipe 26l extends along the right side frame 11r (FIG. 2).

These guide pipes (drive pipes 25 and idle pipes 26) not only protect the push-pull cables 22 from moisture, dust and other foreign matters, but also control the deflection of the push-pull cable 22 as being pushed and pulled by the drive gear 23 so that the rear sliders 7 may be displaced in a prescribed relationship to the rotational angle of the drive gear 23. The two push-pull cables 22l and 22r oppose each other in a mutually parallel relationship (both extending in the lateral direction) at the drive gear 23, and are urged toward each other by spring members so that the rotational movement of the drive gear 23 may be transmitted to the rear sliders 7l and 7r in a properly synchronized relationship. In the illustrated embodiment, the push-pull cable 22 connected to the right lateral end of the sunroof panel 4 or the right rear slider 7r extends along the front side of the drive gear 23, and the push-pull cable 22 connected to the left lateral end of the sunroof panel 4 or the left rear slider 7l extends along the rear side of the drive gear 23.

The sunroof panel 4 defines an outer contour continuously and smoothly connected to the roof panel 2 in the fully closed position thereof. When the electric motor 24 further pulls the push-pull cables 22 via the drive gear 23 from the fully closed position of the sunroof panel 4, the rear end of the sunroof panel 4 is raised to place the sunroof panel 4 in a tilted up position by means of the cam mechanism incorporated in the rear sliders 7. When the push-pull cables 22 are pushed from this state, the sunroof panel 4 is tilted down, and returns to the fully closed position. When the push-pull cables 22 are pushed from the fully closed position, the rear sliders 7 are displaced rearward, and this causes the sunroof panel 4 to be lowered below the roof panel 2 and to be moved rearward at the same time. When the sunroof panel 4 is displaced to the rearmost position thereof, the opening 2a is fully opened. When the push-pull cables 22 are pulled from this state, the sunroof panel 4 eventually closes the roof opening 2a reversing the aforementioned process.

The structure of the vehicle roof around the front frame 12 is now described in the following with reference to FIGS. 4 to 8. FIG. 4 shows the part of the roof 1 surrounding the front frame 12 in plan view with the roof panel 2 and sunroof panel 4 indicated by imaginary lines. Referring to FIGS. 4 and 5, the front frame 12 includes front planar part 12a extending under and in parallel with the roof panel 2 (thereby slightly sloping downward toward the front), a rear planar part 12b extending horizontally behind the front planar part 12a at a lower elevation, and a groove part 12c located between the front planar part 12a and rear planar part 12b and depressed more than these two parts. The groove part 12c includes a front wall 12d, a rear wall 12e and a bottom wall 12f, and the bottom wall 12f is lower than the front planar pat 12a or the rear planar part 12b.

The front planar part 12a is provided with a drive pipe retaining groove 16l (16r) for retaining the drive pipe 25 and an idle pipe retaining groove 17r (17l) for retaining the idle pipe 26, both opening out upward. A side wall of each pipe retaining groove 16 and 17 is provided with a plurality of clamps 18 including resilient tabs 18a resiliently clamping the drive and idle pipes 25 and 26 against the opposing side wall. The free end of each resilient tab 18a is formed with a barb that facilitates the insertion of the pipe 25, 26 into the groove 16, 17, but opposes the dislodging of the pipe from the groove. Thereby, the drive and idle pipes 25 and 26 can be easily installed and removed as required, and are additionally prevented from deflecting once installed even when the drive and idle pipes 25 and 26 are made of relatively flexible plastic material and the push-pull cables 22 received therein are subjected to tensile and compressive forces.

Figure 6:
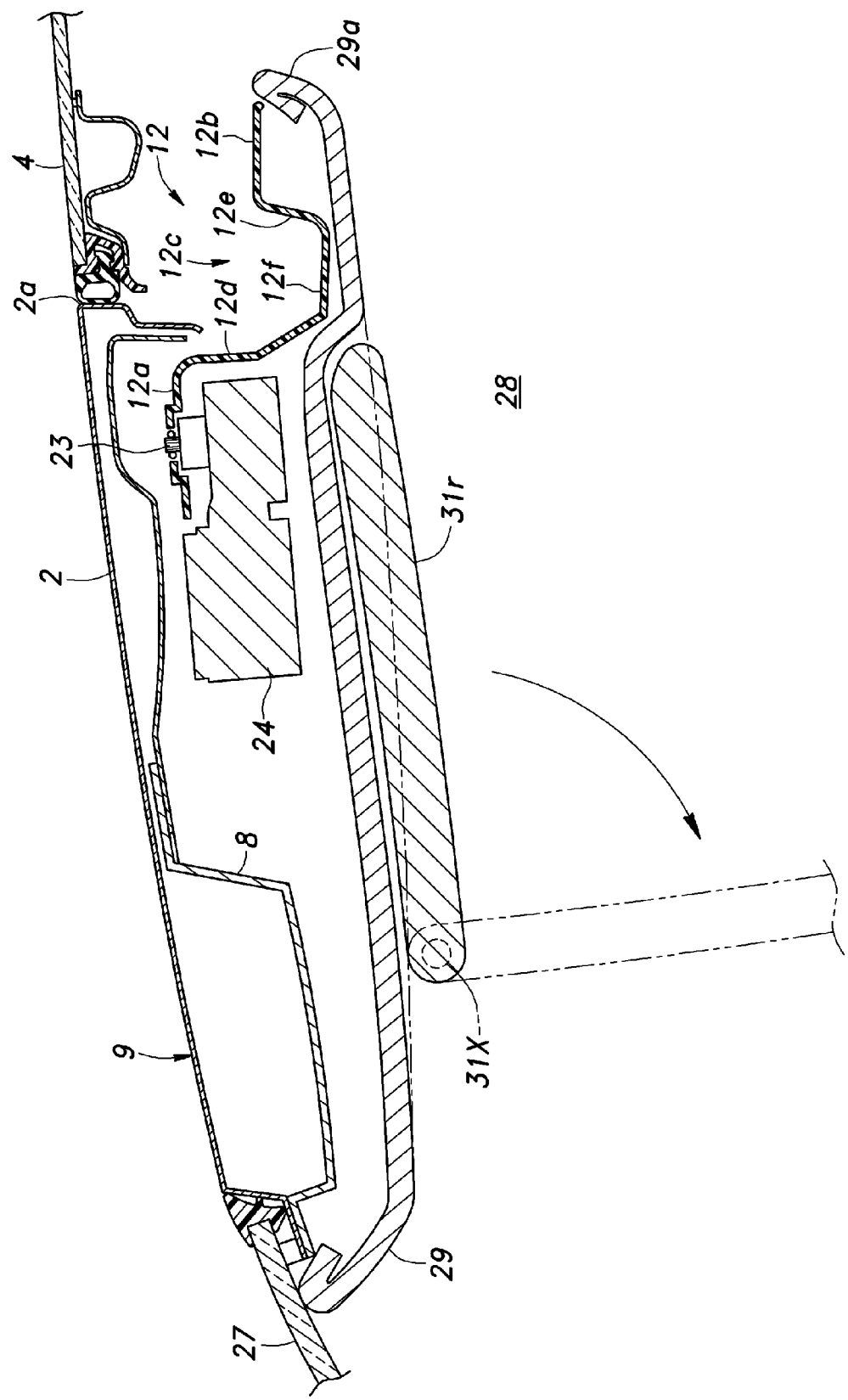
FIG. 6 is a sectional view taken along line VI-VI of FIG. 4.

As shown in FIGS. 4 and 6, the front planar part 12a is formed with a through hole 15 at a part laterally offset to the right from the center for passing the drive gear 23 from below, and the two pipe retaining grooves extend along the front and rear sides of the through hole 15 both in the lateral direction (in a mutually parallel relationship). In particular, the drive pipe retaining groove 16l and the idle pipe retaining groove 17l for the left push-pull cable 22l extends along the rear side of the drive gear 23, and the drive pipe retaining groove 16r and the idle pipe retaining groove 17r for the right push-pull cable 22r extend along the front side of the drive gear 23.

As best shown in FIG. 4, the idle cable sections of the push-pull cables 22 extend along the corresponding side frames 11 on outboard sides of the adjacent drive cable sections of the other push-pull cables 22. Therefore, it is necessary that the two push-pull cables 22 cross each other at least at one location. In that case, the left push-pull cable 22l that meshes with the rear side of the drive gear 23 is required to be more sharply bent than the right push-pull cable 22r that meshes with the front side of the drive gear 23 as the push-pull cable extends from the corresponding lateral end of the front frame 12 to the corresponding side frame 11.

According to the present invention, in addition to that the idle cable section of the left push-pull cable 22l crosses the drive cable section of the right push-pull cable 22r at one location P1, the drive cable section of the left push-pull cable 22l includes a bulging section bulging forward by crossing the idle cable section of the right push-pull cable 22r at two locations P2 and P3. Thereby, the drive cable section of the left push-pull cable 22l which is otherwise required to be most sharply bent is allowed to curve more gradually by forming a bulging section that extend forward beyond the idle cable section of the right push-pull cable 22r.

The drive pipe retaining grooves 16l and 16r are provided at a substantially same elevation as the front planar part 12a over the entire lengths thereof (FIG. 5). On the other hand, the idle pipe retaining grooves 17l and 17r are at the substantial same elevation as the front planar part 12a only in the part adjacent to the through hole 15, and slope progressively downward toward the both lateral sides of the vehicle body so that the idle pipe retaining grooves 17l and 17r are enabled cross under the drive pipe retaining grooves 16l and 16r without interfering with them (FIG. 4).

The front part of the front frame 12 of the front planar part 12 is provided with a plurality (four, in the illustrated embodiment) of mounting bosses 14a to 14d projecting upward and arranged laterally at an approximately regular interval. Each mounting boss is formed with a through hole for receiving a fastener such as a screw or clip that secures the front frame 12 to the roof panel 2 (via a bracket not shown in the drawings). As the front frame 12 is attached to the roof panel 2 at the four locations, the stiffness of the front frame 12 is ensured, and is prevented from excessively deforming or breaking when subjected to the force transmitted from the push-pull cables 22 even though the front frame 12 is made of light-weight plastic material.

The groove part 12c of the front frame 12 is provided with a drain outlet 12g on each lateral end thereof for expelling the rainwater received in the groove part 12c to the drain system of the sunroof system 3 not shown in the drawings. The bottom wall of the drain outlet 12g is substantially at the same elevation as that of the groove part 12c, and the height of the side walls of each drain outlet 12g is determined so as not interfere with the idle pipe 26 extending above the drain outlet 12g.

As shown in FIGS. 4, 7 and 8, the map lamp unit 30 is provided centrally on the front edge of the roof opening 2a, and is received in the opening 29b formed in the roof lining 29 so as to face the interior of the passenger compartment 28. The map lamp unit 30 is fixedly secured to the roof panel 2 via a bracket not shown in the drawings. The map lamp unit 30 may include map lamps for illuminating localized parts of the front seats, a room lamp for illuminating the entire passenger compartment 28 and a switch panel for turning on and off these lamps and controlling the sunroof system 3, as a single assembly supported by a common frame. The main part of the map lamp unit 30 is received in the space between the roof lining 29 and roof panel 2, and the lower surface of the map lamp unit 30 is substantially flush with the surface of the remaining part of the roof lining 29.

The map lamp unit 30 is located between the front wall 12d of the front frame 12 and the rear wall of the front roof frame 9 without interfering with them. In particular, in side view, the map lamp unit 30 is located ahead of the front wall 12d of the front frame 12, and the rear end of the map lamp unit 30 may be located under the front planar part 12a. Because the electric motor 24 is located so as not to overlap with the map lamp unit 30 in front view, the map lamp unit 30 may overlap with the electric motor 24 in side view without interfering with each other. By positioning the map lamp unit 30 so as to be partly located under the front planar part 12a of the front frame 12 and overlap with the electric motor 24 in side view, the distance between the front frame 12 and front roof frame 9, in particular the distance between the front edge of the roof 1 to the front edge of the roof opening 2a of the roof panel 2 can be minimized so that the vehicle occupant's viewing angle of the front edge of the roof opening 2a can be minimized. The electric motor 24 is also located between the rear wall of the front roof frame 9 and the front wall 12d of the front frame 12, and about a rear half of the electric motor 24 is located under the front planar part 12a of the front frame 12. As the electric motor 24 and map lamp unit 30 do not overlap each other in plan view (FIG. 4), the thickness of the roof 1 or the distance between the lower surface of the roof lining 29 and upper surface of the roof panel 2 can be minimized.

Each sun visor 31 is located on the side (or the lower side) of the roof lining 29 facing the passenger compartment 28, and is pivotable around a pivot shaft 31X extending laterally between a stowed position closely overlying the lower surface of the roof lining 29 as indicated by the solid lines in FIG. 6, and a deployed position extending vertically downward from the pivot shaft 31X as indicated by the imaginary lines in FIG. 6 to shield the sunlight from the front from the view of the vehicle occupant.

In particular, because the electric motor 24 is placed in a laterally offset position, one of the sun visors 31 is located under the electric motor 24 in the stowed position thereof in an overlying relationship in plan view, the sun visor 31 can shield or muffle the acoustic noises generated from the electric motor 24. The roof lining 29 is formed with a pair of recesses 29c for at least partly receiving the corresponding sun visors 31 therein. The rear end of each recess 29c is located ahead of the front wall 12d of the groove part 12c of the front frame 12 so that the recesses 29c can be formed by making use of the space available above the upper surface of the corresponding parts of the roof lining 29, and the protrusion of the sun visors 31 from the lower surface of the roof lining 29 can be minimized.

Referring to FIG. 4, the leftmost mounting boss 14a is located between the drive pipe retaining groove 16l and idle pipe retaining groove 17r on the front planar part 12a of the front frame 12, and the second mounting boss 14b from the left is located adjacent to the left end of the map lamp unit 30. The third mounting boss 14c from the left is located adjacent to the right end of the map lamp unit 30 or between the map lamp unit 30 and electric motor 24, and the rightmost mounting boss 14d is located adjacent to the right end of the electric motor 24 and between the drive pipe retaining groove 16r and idle pipe retaining groove 17l on the front planar part 12a of the front frame 12. Therefore, two of the attaching points 14a and 14d are located between the two push-pull cables on either side of the middle crossing location P2. In the illustrated embodiment, the four mounting bosses 14a to 14d are arranged at an equal interval, but may also be located at irregular intervals.

As the third mounting boss 14c is located between the map lamp unit 30 and electric motor 24, the spacings between the adjacent mounting bosses 14a to 14d can be at least relatively uniform without causing any one of the spacings to be excessively great so that the front frame 12 is free from any low-stiffness region even though the front frame 12 is made of plastic material or other relatively flexible material. As the two of the mounting bosses 14c and 14d are provided on either side of the electric motor 24 in close proximity, the stiffness of the part of the front frame 12 adjacent to the electric motor 24 is particularly increased so that the front frame 12 is prevented from excessively deforming or breaking by the force transmitted from the electric motor 24 when actuating the push-pull cables 22 even though the front frame 12 is made of plastic material or other relatively flexible material.

Although the present invention has been described in terms of a preferred embodiment thereof, it is obvious to a person skilled in the art that various alterations and modifications are possible without departing from the scope of the present invention which is set forth in the appended claims. For instance, the present invention is equally applicable to a sunroof system which is capable of only the slide movement, and also to a sunshade system which opens and closes a moveable roof panel in the form of a sunshade configured to open and close an opening provided in the roof lining. For actuating the sunroof or sunshade panel, rack belts and other cables capable of transmitting the actuating force can also be used, instead of the push-pull cables of the illustrated embodiment, without departing from the spirit of the present invention.

The contents of the original Japanese patent application on which the Paris Convention priority claim is made for the present application as well as the contents of the prior art references mentioned in this application are incorporated in this application by reference.

The invention claimed is:

1. A vehicle roof system for closing and opening a roof opening formed in a fixed roof panel of a vehicle with a moveable roof panel, said vehicle roof system comprising:
a front frame secured to a lower surface of the fixed roof panel and extending laterally along a front edge of the roof opening, the front frame formed from a plastic material and comprising a front planar part extending forwardly thereon;
a pair of side frames secured to the fixed roof panel and extending longitudinally along either side edge of the roof opening;
a pair of guide rails fixedly secured to the respective side frames to guide the moveable roof panel for the closing and opening movements thereof;
an electric motor attached to the front frame and having a vertically extending output shaft fitted with a drive gear, wherein the electric motor is mounted on the fixed roof panel at a position laterally offset toward one side of the moveable roof panel;
a first push-pull cable guided along the front frame and meshing with a rear side of the drive gear, the first push-pull cable including a drive cable section extending between the drive gear and a first side part of the moveable roof panel and an idle cable section extending from the drive gear to at least a lateral end of the front frame adjacent to a second side part of the moveable roof panel; and
a second push-pull cable guided along the front frame and meshing with a front side of the drive gear, the second push-pull cable including a drive cable section extending between the drive gear and the second side part of the moveable roof panel and an idle cable section extending from the drive gear at least to a lateral end of the front frame adjacent to the first lateral side part of the moveable roof panel;
wherein the front planar part of the front frame is provided with first and second cable retaining grooves formed therein for retaining the first and second push-pull cables, each of the cable retaining grooves opening upwardly;
and wherein the push-pull cables cross each other at three locations on the front frame in plan view.

2. The vehicle roof system according to claim 1, wherein the idle cable sections of the push-pull cables extend along the corresponding side frames on outboard sides of the adjacent drive cable sections of the other push-pull cables.

3. The vehicle roof system according to claim 2, wherein the idle cable section of the first push-pull cable crosses the drive cable section of the second push-pull cable at one location, and the drive cable section of the first push-pull cable includes a bulging section bulging forward by crossing the idle cable section of the second push-pull cable at two locations.

4. The vehicle roof system according to claim 3, wherein the drive cable section of the second push-pull cable includes a bulging section that bulges forward as the second push-pull cable reaches a lateral end of the front frame and bends rearward toward the second side part of the moveable roof panel.

5. The vehicle roof system according to claim 3, wherein a middle crossing location of the two push-pull cables is located at a substantially laterally central part of the fixed roof panel.

6. The vehicle roof system according to claim 5, wherein the front frame is attached to the fixed roof panel at a plurality of points laterally arranged along the front edge of the roof opening, and at least two of the attaching points are located between the two push-pull cables on either side of the middle crossing location.

7. The vehicle roof system according to claim 3, wherein the front frame is attached to the fixed roof panel at a plurality of points laterally arranged along the front edge of the roof opening, and at least one of the attaching points is located between the two push-pull cables.

8. The vehicle roof system of claim 1, wherein each of the cable retaining grooves of the front frame comprises a pair of opposed side walls which are provided with a plurality of opposed resilient tabs, each of said tabs having a free end formed with a barb thereon.

* * * * *